United States Patent [19]

Mori

[11] Patent Number: 4,636,028
[45] Date of Patent: Jan. 13, 1987

[54] LIGHT DIVERTING DEVICE

[76] Inventor: Kei Mori, 3-16-3-501, Kaminoge, Setagaya-ku, Tokyo, Japan

[21] Appl. No.: 668,228

[22] Filed: Nov. 5, 1984

[30] Foreign Application Priority Data

Nov. 10, 1983 [JP] Japan ................... 58-211643
Nov. 16, 1983 [JP] Japan ................... 58-215810

[51] Int. Cl.⁴ .......................... G02B 6/26; G02B 6/42
[52] U.S. Cl. ...................... 350/96.15; 350/267
[58] Field of Search ............ 350/96.15, 96.20, 96.21, 350/97, 266, 267

[56] References Cited

U.S. PATENT DOCUMENTS

| | | | |
|---|---|---|---|
| 3,416,089 | 12/1968 | Koester et al. | 350/96.15 |
| 3,936,142 | 2/1976 | Kerster | 350/96.15 |
| 4,057,719 | 11/1977 | Lewis | 350/96.15 |
| 4,121,884 | 10/1978 | Greenwood | 350/96.15 |
| 4,130,345 | 12/1978 | Doellner | 350/96.15 |
| 4,165,496 | 8/1979 | Di Domenico et al. | 350/96.15 |
| 4,286,232 | 8/1981 | Puech et al. | 350/96.15 |
| 4,296,995 | 10/1981 | Bickel | 350/96.15 |
| 4,307,932 | 12/1981 | Winzer | 350/96.15 |
| 4,325,605 | 4/1982 | Winzer et al. | 350/96.15 |
| 4,351,585 | 9/1982 | Winzer et al. | 350/96.15 |
| 4,373,775 | 2/1983 | Gasparian | 350/96.15 |
| 4,378,143 | 3/1983 | Winzer | 350/96.15 |
| 4,387,954 | 6/1983 | Beasley | 350/96.15 |
| 4,431,262 | 2/1984 | Tolles | 350/96.15 |
| 4,452,505 | 6/1984 | Gasparian | 350/96.15 |
| 4,468,567 | 8/1984 | Sasano et al. | 350/96.15 |
| 4,505,539 | 3/1985 | Auracher et al. | 350/96.15 |

FOREIGN PATENT DOCUMENTS

| | | | |
|---|---|---|---|
| 3303160 | 8/1984 | Fed. Rep. of Germany | 350/96.15 |
| 3310587 | 9/1984 | Fed. Rep. of Germany | 350/96.15 |
| 8206828 | 10/1983 | France | 350/96.15 |
| 105206 | 8/1980 | Japan | 350/96.15 |
| 85703 | 7/1981 | Japan | 350/96.15 |

*Primary Examiner*—William L. Sikes
*Assistant Examiner*—Robert E. Wise
*Attorney, Agent, or Firm*—Jordan and Hamburg

[57] ABSTRACT

A part of the light energy transmitted through an optical conductor is diverted and taken out of it.

The device is made up of a first optical conductor rod having a through-hole in a radial direction, a second optical conductor rod tightly inserted into the half way position of the through-hole and firmly fixed thereon, the edge surface of the second optical conductor rod in the through-hole being formed on a surface inclined in relation to the direction of the first optical conductor rod's axis, a third optical conductor rod tightly inserted into the remaining portion of the through-hole, the edge surface of the third optical conductor rod in the through-hole being formed so as to be engaged with the inclined surface of the second optical conductor rod, and a fourth optical conductor rod firmly fixed on the outer circumferential surface of the first optical conductor rod so as to cover the inserted portion of the second optical conductor rod, the third optical conductor rod having a groove formed along the direction of the third optical conductor rod's axis and the inclined surface of the third optical conductor rod being fixed leaving a predetermined distance or gap between it and the inclined surface of the second optical conductor rod.

4 Claims, 5 Drawing Figures

4,636,028

LIGHT DIVERTING DEVICE

BACKGROUND OF THE INVENTION

The present invention relates to a light diverting device for diverting a part of the light energy transmitted through an optical conductor rod and for taking it out.

The present applicant has previously proposed various ways for focusing solar rays or artificial rays by means of a lens or the like and by guiding them into an optical conductor, and further transmitting them through it onto an optional desired place for use in illumination or for other purposes.

However, in such cases, if the light energy propagated through the optical conductor can be diverted at the half way point and taken out of the optical conductor, it may be possible to improve the efficiency of such devices. In the past, such light diverting means didn't exist and it was inconvenient in some ways to utilize light-transmitting devices.

SUMMARY OF THE INVENTION

It is an object of the present invention to provide a light diverting device in which a part of the light energy propagated through an optical conductor rod is diverted and taken out therefrom.

It is another object of the present invention to provide a light diverting device in which the light energy can be effectively diverted by use of a device which can be easily manufactured and by which the amount of diverted light can be adjusted.

Such a device is made up of a first optical conductor rod having a through-hole in a radial direction, a second optical conductor rod tightly inserted into the half way point of the through-hole and firmly fixed therein, the edge surface of the second optical conductor rod in the through-hole being formed on a surface which is inclined in relation to the direction of the first optical conductor's axis, a third optical conductor rod tightly inserted into the remaining portion of the through-hole, the edge surface of which is engaged with said inclined surface of the second optical conductor rod, and a fourth optical conductor rod firmly fixed on the outer circumferential surface of the first optical conductor rod so as to cover the inserted portion of the second optical conductor rod, the third optical conductor rod having a couple of grooves formed in the direction of the third optical conductor rod's axis in a symmetrical position in relation to the direction of the first optical conductor rod's axis, and the inclined surface of the third optical conductor rod being fixed, leaving a predetermined distance or gap between it and the inclined surface of the second one.

The above-mentioned features and other advantages of the present invention will be apparent from the following detailed description which goes with the accompanying drawings.

DESCRIPTION OF THE PREFERRED EMBODIMENTS

Figure 1:
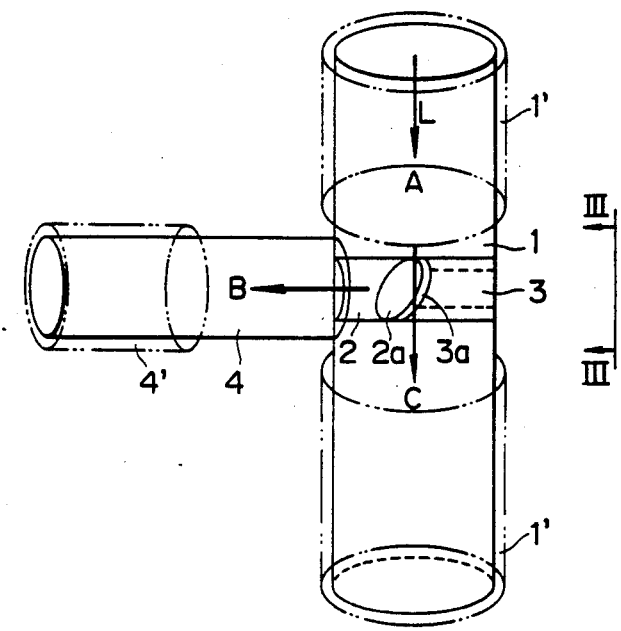
FIG. 1 is a front view for explaining an embodiment of a light diverting device according to the present invention.
Figure 2:
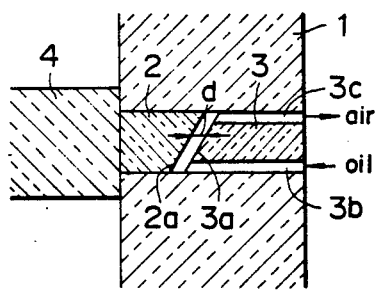
FIG. 2 is a cross-sectional view thereof.
Figure 3:
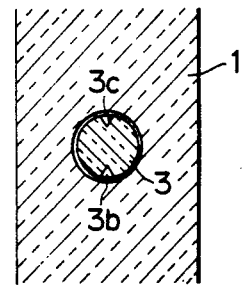
FIG. 3 is a side view thereof as seen along the line III—III of FIG. 1.

FIG. 1 is a front view for explaining an embodiment of the light diverting device according to the present invention. FIG. 2 is a cross-sectional view thereof. FIG. 3 is a side view thereof as seen along the line III—III of FIG. 1. In those drawings, 1 is a first optical conductor rod, and it has a through-hole bored in a radial direction. A second optical conductor rod 2 and a third optical conductor rod 3 are tightly inserted into the through-hole and firmly fixed by use of optical paste or the like. The edge surface of the second optical conductor rod 2, at its inserted side in the through-hole, is formed on the surface 2a which is inclined in relation to the direction of the first optical conductor rod's axis. The third optical conductor rod 3 has an inclined surface 3a opposed to the inclined surface 2a of the second optical conductor rod 2. These inclined surfaces are arranged so as to create a predetermined interval (gap) d. As shown in FIG. 3, the third optical conductor rod 3 has a couple of grooves 3b and 3c formed in the direction of the third optical conductor rod's 3 axis and is in a symmetrical position in relation to the direction of the first optical conductor rod's 1 axis. Optical oil is poured through the groove 3b into the gap between the second optical conductor rod 2 and the third one 3, and then the air in the gap is released outside through a groove 3c.

When the gap is not provided with optical oil, the light rays L propagating through the first optical conductor rod 1 in a direction shown by arrow A are reflected on the inclined surface 2a of the second optical conductor rod 2 and directed in the direction of arrow B. On the contrary, when the gap is completely filled with optical oil, the light rays L are directed in the direction of arrow C. On that occasion, the amount of light rays propagated to B can be adjusted in accordance with the amount of optical oil placed in the gap. Less optical oil will result in more light rays being propagated to B.

There is a fourth optical conductor rod 4 which is firmly fixed onto the outer circumferential surface of the first optical conductor rod 1 so as to cover the inserted portion of the second optical conductor rod 2 which is unitarily formed with the second optical conductor rod 2. In such a way as described heretofore, the light rays diverted in the direction of B are taken out through the fourth optical conductor rod 4 and transmitted through an optical conductor cable not shown in the drawings but which is connected with the fourth optical conductor rod 4.

Furthermore, 1' and 4' are cladding layers of the first optical conductor rod 1 and the fourth one 4, respectively. The embodiment for FIGS. 1 through 3 shows a design of the light diverting device in which the cladding layer is removed from the optical conductor rod. It can be easily seen that the optical conductor rod having no cladding layer may be allowed to work from the beginning. Furthermore, it can be easily understood that the light diverting device, according to the present invention, may be employed in a position where the inclined surfaces 2a and 3a do not become horizontal.

Figure 4:
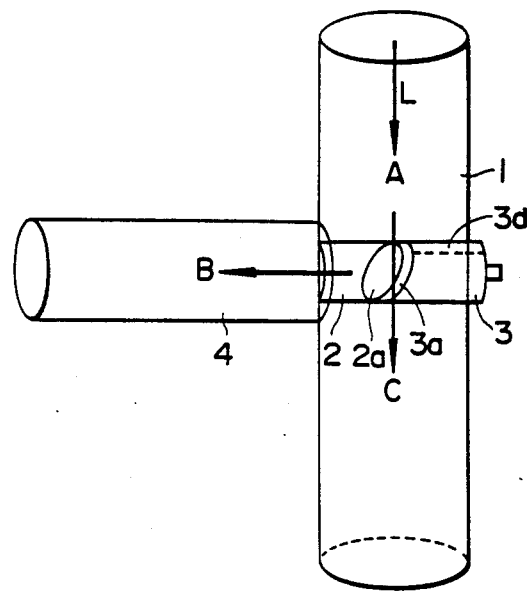
FIG. 4 is a front view for explaining another embodiment of the light diverting device according to the present invention.
Figure 5:
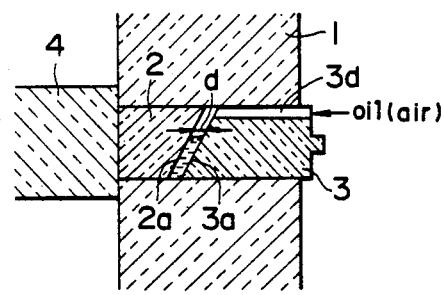
FIG. 5 is a cross-sectional view thereof.

FIG. 4 is a front view for explaining another embodiment of the light diverting device according to the present invention; and FIG. 5 is a cross-sectional view thereof. In this embodiment, the third optical conductor rod 3 is tightly inserted into the through-hole so as to be able to move back and forth. A groove 3d is bored at the upper edge-portion of the third optical conductor rod 3 along the same direction as the shaft. Optical oil is poured through the groove 3d into the gap d between the inclined surface 2a of the second optical conductor rod 2 and the inclined surface 3a of the third one 3. When the third optical conductor rod 3 moves back and forth the air in the gap is released outside or contrarily air is taken into the gap in order to facilitate the movement of the third optical conductor rod 3.

In such a manner, when the third optical conductor rod 3 is pushed forward, after optical oil has been poured into the gap d, the size of the gap d becomes smaller and consequently the level of optical oil rises. On the contrary, when it is pulled backward, the size of the gap d becomes larger so that the level of optical oil falls.

Under such circumstances, the light rays L, propagated through the first optical conductor rod 1 in the direction shown by arrow A, are reflected on the inclined surface 2a of the second optical conductor rod 2 and directed in the direction shown by arrow B, into the area of the gap where there is no optical oil present. On the other hand, the light rays L are directed in the direction shown by arrow C where optical oil present. In such a case the amount of light rays propagated in the direction of B can be adjusted in accordance with the level of optical oil in the gap. It may be possible to change the condition of its adjustment by changing the insertion depth of the third optical conductor rod 3.

What is claimed is:

1. A light diverting device, is characterized in that said light diverting device is comprised of a first optical conductor rod, having a through-hole in a radial direction, a second optical conductor rod tightly inserted into the half way point of said through-hole and firmly fixed thereon, the edge surface of said second optical conductor rod in said through-hole being formed on a surface inclined in relation to the direction of said first optical conductor rod's axis, a third optical conductor rod tightly inserted into the remaining portion of said through-hole, the edge surface of said third optical conductor rod in said through-hole being formed so as to be engaged with said inclined surface of said second optical conductor rod, and a fourth optical conductor rod firmly fixed on the outer circumferential surface of said first optical conductor rod so as to cover the inserted portion of said second optical conductor rod, said third optical conductor rod having a couple of grooves formed along the direction of said third optical conductor rod's axis in a symmetrical position in relation to the direction of said first optical conductor rod's axis, and said inclined surface of said third optical conductor rod being fixed leaving a predetermined distance between it and said inclined surface of said second optical conductor rod.

2. A light diverting device as defined in claim 1, is characterized in that a desired amount of optical oil is enclosed in said distance through one of said grooves.

3. A light diverting device, is characterized in that said light diverting device is comprised of a first optical conductor rod having a through-hole in a radial direction, a second optical conductor rod tightly inserted into the half way point of said through-hole and firmly fixed thereon, the edge surface of said second optical conductor in said through-hole being formed on a surface inclined in relation to the direction of said first optical conductor rod's axis, a third optical conductor rod tightly inserted into the remaining portion of said through-hole, the edge surface of said third optical conductor rod in said through-hole being formed so as to be engaged with said inclined surface of said second optical conductor rod, and a fourth optical conductor rod firmly fixed on the outer circumferential surface of said first optical conductor rod so as to cover the inserted portion of said second optical conductor rod, and in said through-hole, optical oil is inserted in the space between the inclined surface of said second optical conductor rod and that of said third optical conductor rod.

4. A light diverting device as defined in claim 3, is characterized in that said third optical conductor rod is tightly inserted into said through-hole so as to be able to move back and forth.

* * * * *